United States Patent
Mohindra

(10) Patent No.: US 10,067,593 B2
(45) Date of Patent: Sep. 4, 2018

(54) INTER-SYMBOL INTERFERENCE REDUCTION FOR TOUCH PANEL SYSTEMS

(71) Applicant: QUALCOMM Incorporated, San Diego, CA (US)

(72) Inventor: Rishi Mohindra, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 14/951,230

(22) Filed: Nov. 24, 2015

(65) Prior Publication Data

US 2016/0147370 A1 May 26, 2016

Related U.S. Application Data

(63) Continuation of application No. 13/479,428, filed on May 24, 2012, now abandoned.

(60) Provisional application No. 61/495,354, filed on Jun. 9, 2011.

(51) Int. Cl.
*G06F 3/045* (2006.01)
*G06F 3/041* (2006.01)
*G06F 3/044* (2006.01)
*G06F 3/047* (2006.01)

(52) U.S. Cl.
CPC ............ *G06F 3/0416* (2013.01); *G06F 3/044* (2013.01); *G06F 3/047* (2013.01); *G06F 3/0418* (2013.01)

(58) Field of Classification Search
CPC ....... G06F 3/044; G06F 3/0416; G06F 3/0418
USPC .................................................. 345/173–174
See application file for complete search history.

(56) References Cited

U.S. PATENT DOCUMENTS

| 7,808,255 | B2 | 10/2010 | Hristov et al. |
| 7,821,274 | B2 | 10/2010 | Philipp et al. |
| 7,821,502 | B2 | 10/2010 | Hristov |
| 7,864,160 | B2 | 1/2011 | Geaghan et al. |
| 7,932,898 | B2 | 4/2011 | Philipp et al. |
| 8,982,091 | B1 | 3/2015 | Mohindra |
| 9,235,280 | B1 | 1/2016 | Mohindra |
| 2004/0095333 | A1* | 5/2004 | Morag ................ G06F 3/03545 345/173 |
| 2005/0146513 | A1* | 7/2005 | Hill ......................... G06F 3/043 345/173 |

(Continued)

FOREIGN PATENT DOCUMENTS

CN 201266366 Y 7/2009
CN 101661359 A 3/2010

(Continued)

*Primary Examiner* — Kwin Xie
(74) *Attorney, Agent, or Firm* — Weaver Austin Villeneuve & Sampson LLP-QUAL

(57) ABSTRACT

A touch panel system is described that is configured to reduce inter-symbol interference (ISI). In an implementation, the touch panel system includes a touch panel assembly that includes a plurality of drive electrodes arranged one next to another and a plurality of sensor electrodes arranged one next to another across the drive electrodes to form a plurality of pixels having a mutual capacitance. The touch panel system also includes a transmitter configured to drive the drive electrodes with drive signals derived at least partially from excitation values. The transmitter is configured to apply a window function to the drive signals. The system also includes a receiver configured to sense signals furnished from the sensor electrodes and to determine the mutual capacitance of the pixels.

20 Claims, 10 Drawing Sheets

(56) References Cited

U.S. PATENT DOCUMENTS

| | | |
|---|---|---|
| 2007/0279397 A1 | 12/2007 | Cho et al. |
| 2008/0158175 A1* | 7/2008 | Hotelling ............... G06F 3/0418 345/173 |
| 2008/0158179 A1 | 7/2008 | Wilson |
| 2009/0167326 A1 | 7/2009 | Geaghan |
| 2010/0044122 A1 | 2/2010 | Sleeman et al. |
| 2010/0059295 A1 | 3/2010 | Hotelling et al. |
| 2010/0156811 A1 | 6/2010 | Long et al. |
| 2010/0156846 A1 | 6/2010 | Long et al. |
| 2010/0258360 A1 | 10/2010 | Yilmaz |
| 2011/0061948 A1* | 3/2011 | Krah ...................... G06F 3/0418 178/18.01 |
| 2011/0134076 A1 | 6/2011 | Kida et al. |
| 2011/0210941 A1 | 9/2011 | Reynolds et al. |
| 2011/0261007 A1 | 10/2011 | Joharapurkar et al. |
| 2011/0273399 A1 | 11/2011 | Lee |
| 2011/0291986 A1* | 12/2011 | Rebeschi ................ G06F 3/044 345/174 |
| 2012/0056841 A1* | 3/2012 | Krenik ..................... G06F 3/044 345/174 |
| 2012/0313890 A1* | 12/2012 | Mohindra ............. G06F 3/0416 345/174 |

FOREIGN PATENT DOCUMENTS

| | | |
|---|---|---|
| CN | 101719045 A | 6/2010 |
| CN | 101876863 A | 11/2010 |
| CN | 102053764 A | 5/2011 |

* cited by examiner

INTER-SYMBOL INTERFERENCE REDUCTION FOR TOUCH PANEL SYSTEMS

CROSS-REFERENCE TO RELATED APPLICATIONS

The present application is a continuation of U.S. patent application Ser. No. 13/479,428, entitled INTER-SYMBOL INTERFENCE REDUCTION FOR TOUCH PANEL SYSTEMS, filed on May 24, 2012, which claims the benefit of priority under 35 U.S.C. § 119(e) of U.S. Provisional Application Ser. No. 61/495,354, entitled ISI REDUCTION FOR MUTUAL AND SELF CAPACITANCE PANEL, filed on Jun. 9, 2011. The disclosure of the prior applications are considered part of and are incorporated by reference in this patent application.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch panel is an electronic visual display that incorporates a touch panel overlying a display to detect the presence and/or location of a touch within the display area of the screen. Touch panels are common in devices such as all-in-one computers, tablet computers, satellite navigation devices, gaming devices, and smartphones. A touch panel enables an operator to interact directly with information that is displayed by the display underlying the touch panel, rather than indirectly with a pointer controlled by a mouse or touchpad. Capacitive touch panels are often used with touch panel devices. A capacitive touch panel generally includes an insulator, such as glass, coated with a transparent conductor, such as indium tin oxide (ITO). Since the human body is also an electrical conductor, touching the surface of the panel results in a distortion of the panel's electrostatic field, measurable as a change in capacitance.

SUMMARY

A touch panel system is described that is configured to reduce inter-symbol interference (ISI). In an implementation, the touch panel system includes a touch panel assembly that includes a plurality of drive electrodes arranged one next to another, and a plurality of sensor electrodes arranged one next to another across the drive electrodes to form a plurality of pixels having a mutual capacitance. The touch panel system also includes a transmitter configured to drive the drive electrodes with drive signals derived at least partially from excitation values. The transmitter is configured to apply a window function to the drive signals. The system also includes a receiver configured to sense signals furnished from the sensor electrodes and to determine the mutual capacitance of the pixels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers and/or labels in different instances in the description and the figures may indicate similar or identical items.

DETAILED DESCRIPTION

Overview

Figure 1:
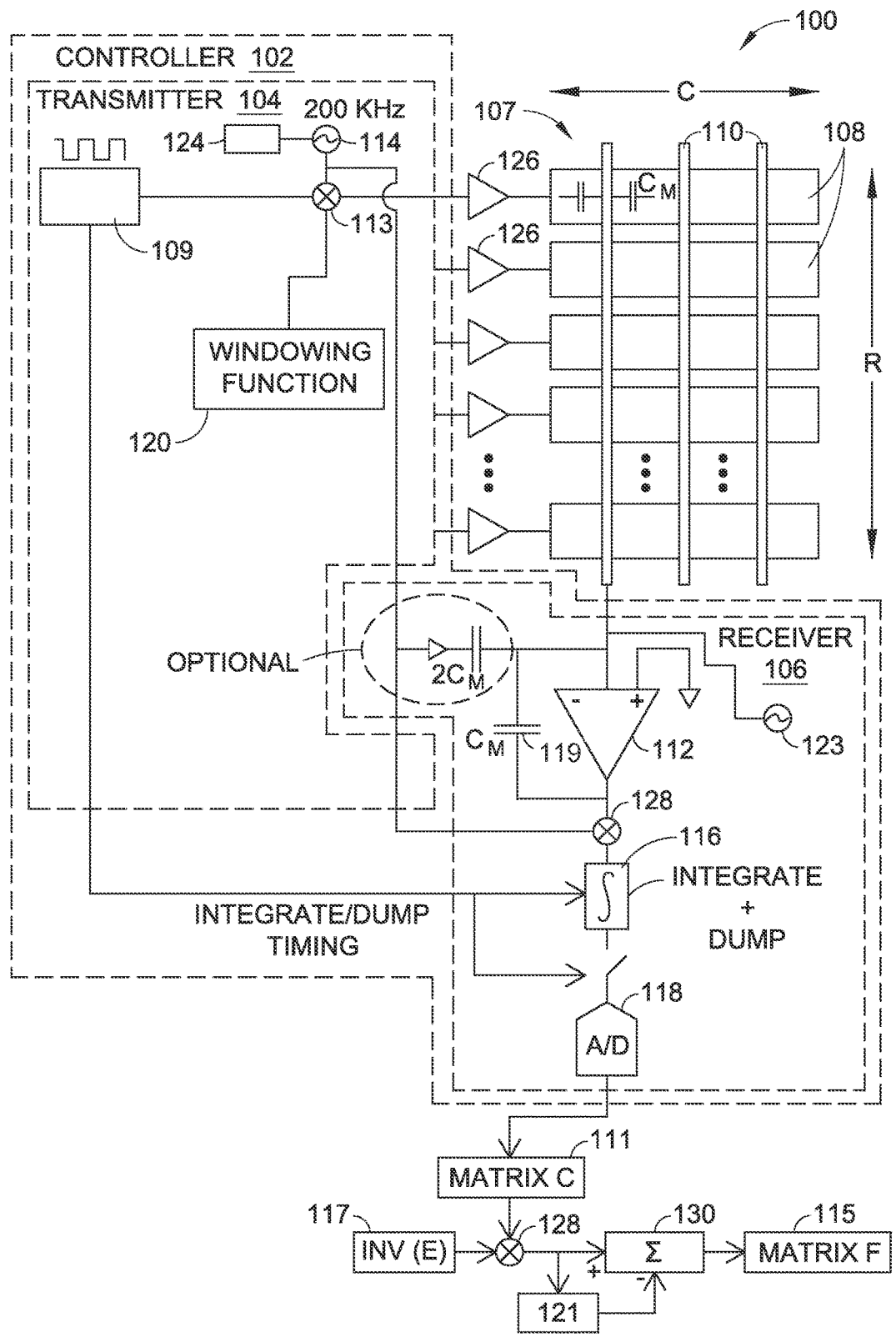
FIG. 1 is a diagrammatic illustration that depicts a portion of a touch panel system with capacitive feedback at the receiving unit in an example implementation in accordance with the present disclosure.

Many modern electronic devices incorporate a touch panel to display information as an input that is activated by touching the display. One technology for implementing the touch aspect of a touch panel is capacitance sensing. An insulator, such as glass, is coated with a transparent conductor, such as indium tin oxide (ITO). Since the human body is an electrical conductor, when a finger actuates the touch panel, such as by touching or even getting very close to its surface, the electrostatic field of the touch panel is distorted, resulting in a measurable change in capacitance.

A mutual capacitance touch panel comprises two layers of material arranged in an X-Y grid such that an actuation of the touch panel can be resolved into a coordinate. A finger is typically larger than the spacing of X-Y grid lines in the layers of a mutual capacitance touch panel. Thus, multiple grid lines can be activated at different voltage levels during a single actuation of the touch panel. A capacitive touch panel controller is able to resolve the voltages on the X-Y multiple grid lines into an X-Y coordinate.

Inter-symbol interference (ISI) typically causes distortion within these touch panels. Inter-symbol interference is a form of distortion of a signal in which a symbol (e.g., modulation rate) interferes with later symbols. Inter-symbol interference is usually caused by multipath propagation, or inherent non-linear frequency responses within a channel (e.g., transmission medium). The presence of inter-symbol interference usually introduces errors in a decision device at the receiver output.

Therefore, a touch panel system is described that is configured to reduce inter-symbol interference (ISI). In an implementation, the touch panel system includes a touch panel assembly that includes a plurality of drive electrodes arranged one next to another, and a plurality of sensor electrodes arranged one next to another across the drive electrodes to form a plurality of pixels having a mutual capacitance. The touch panel system also includes a transmitter configured to drive the drive electrodes with drive signals derived at least partially from excitation values. The transmitter is configured to apply a window function to the drive signals. The window function is configured to cause the value of the drive signal occurring outside a pre-defined subset of the signal to be zero (0) to reduce ringing and out-of-band spectral energy associated with the drive signal. In an implementation, the window function may be a non-overlap window function or an overlap window function. The system also includes a receiver configured to sense signals furnished from the sensor electrodes and to determine the mutual capacitance of the pixels. The receiver may also include an offset signal generator that is configured to generate an offset signal that at least substantially cancels the drive signal within the receiver. The window function may also be applied to the offset signal in some instances.

Example Implementation

FIG. 1 illustrates an example implementation of a capacitive touch panel system 100 (e.g., mutual capacitance, self-capacitance) in accordance with the present disclosure. The capacitive touch panel system 100 includes controller 102 for reducing inter-symbol interference (ISI) within the touch panel system 100. The controller 102 is communicatively coupled to a transmitter 104, which is configured to generate one or more signals having periodic waveform characteristics, and a receiver 106, which is configured to receive one or more signals from the touch panel assembly 107. The controller 102 is representative of control functionality that may be implemented in hardware, software, firmware, combinations thereof, or the like. The touch panel assembly 107 includes a plurality of drive electrodes 108 (rows of conductors extending along a horizontal axis) positioned over a plurality of sensor electrodes 110 (columns of conductors extending along a vertical axis). In an implementation, the drive electrodes 108 and the sensor electrodes 110 comprise lines, traces, or the like. In the context of the present disclosure, the drive electrodes 108 and the sensor electrodes 110 are described as being positioned vertically and horizontally, respectively. However, it is contemplated that the drive electrodes 108 and the sensor electrodes 110 may be implemented in other configurations. For example, the drive electrodes 108 may be configured as rows extending along a horizontal axis, and the sensor electrodes 110 may be configured as columns extending along a vertical axis.

The drive electrodes 108 and the sensor electrodes 110 correspond to a coordinate system, where each coordinate location 106 (pixel) comprises a capacitor formed at an intersection between the drive electrode 108 and the sensor electrode 110. The drive electrodes 108 are driven by a drive signal (e.g., a current source) to generate a local electrostatic field at each capacitor, and a change in the local electrostatic field generated by the touch of an instrument (e.g., a finger or a stylus) at each capacitor causes a change in capacitance (e.g., a reduction in capacitance) at the corresponding coordinate location/pixel. In an implementation, the sensor electrodes are sensed with an amplifier. The edges of the sensor electrode 110 have a capacitance with the drive electrodes beneath them.

Signaling schemes are used to detect the change in mutual capacitance between the drive electrodes 108 and the sensor electrodes 110. In some embodiments, a drive electrode 102 is excited with a signal having periodic waveform characteristics (e.g., a sine wave). The output signal is sensed at the sensor electrodes 110, preferably using an operational amplifier 112 having a capacitive feedback component 119. The operational amplifier 112 is configured to furnish an output voltage having a gain larger than the voltage difference between the input terminals of the operational amplifier 112. For example, the operational amplifier is configured to amplify the input signal furnished from the sensor electrodes 110. In an implementation, the inverting terminal of the operational amplifier 112 is coupled to the sensor electrodes 110 and the inverting terminal is tied to ground.

In an implementation, the output signal (voltage) can be modeled by:

$$V_{out}=\text{current}(i)*\text{capacitive feedback}(C_F) \quad \text{(Equation 1);}$$

and the input voltage can be modeled by:

$$i=\text{input voltage}(V_{in})/\text{mutual capacitance}(C_m) \quad \text{(Equation 2).}$$

As a single drive electrode 108 is driven one at a time, the output voltage at a sensor electrode 110 is sensed via the operational amplifier 112. A baseline history of signal values are maintained (e.g., values when there is at least substantially no local electrostatic field generated by the touch of an instrument) within the baseline storage module 121. The baseline voltage value is represented by $V_{outB}$, which is the average voltage over an interval of time. When an instrument (e.g., finger) is applied proximal to a pixel, a slight change in the output voltage level is detected by the operational amplifier 112. The new voltage output reading is represented by $Vout_F$, and the change in the output voltage $\Delta V_{out}$ may be represented by:

$$\Delta V_{out}=V_{outF}-V_{outB} \quad \text{(Equation 3)}$$

The $\Delta V_{out}$ is utilized to determine when a change in voltage has occurred due to an instrument being positioned over the touch panel assembly 107. In an implementation, at least substantially all of the drive electrodes 108 are driven simultaneously with $V_1(t)$, $V_2(t)$, to $V_N(t)$ (see FIG. 1) FIG. 1 illustrates an implementation of a portion of a touch panel assembly 107 with capacitive feedback $C_F$ at a portion of the receiver 106 (e.g., operational amplifier 112) in accordance with the present disclosure. Thus, at least substantially all of the drive electrodes 108 are driven simultaneously and at least substantially all of the sensor electrodes 110 are sensed simultaneously. Based upon the sensed output signal, the position of the instrument (e.g., finger) over the touch panel can be decoded, which is described in greater detail below.

Figure 2:
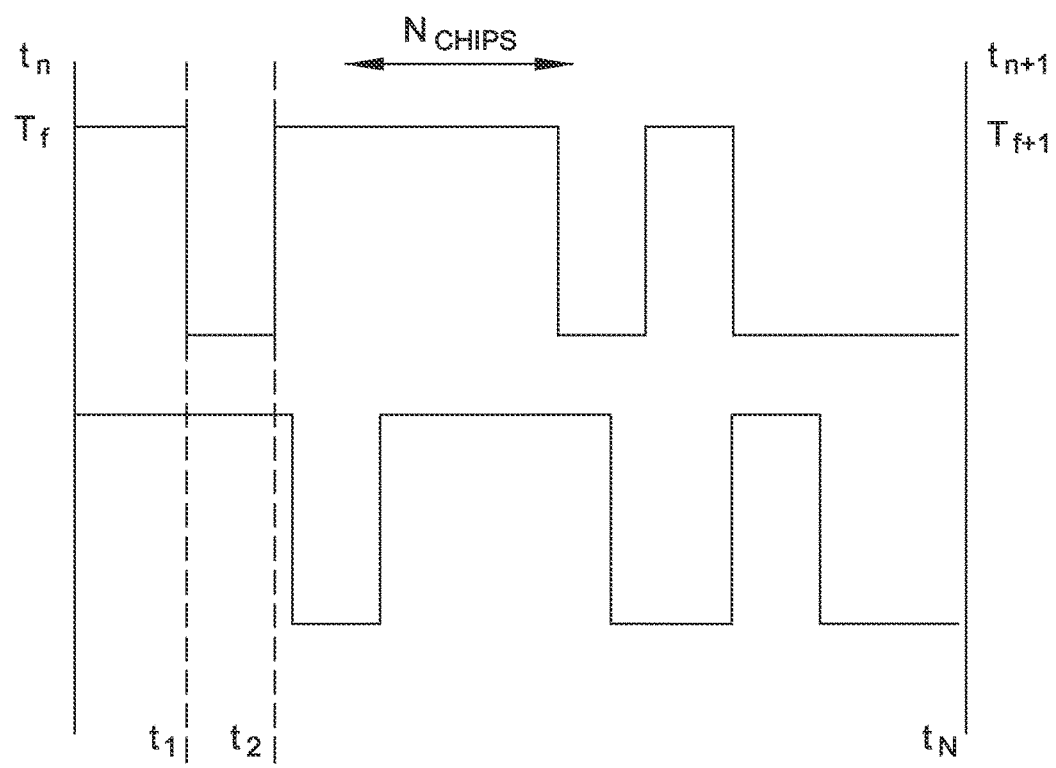
FIG. 2 is a graph that illustrates a drive signal bit stream based on an excitation matrix in an example implementation in accordance with the present disclosure.
Figure 3:
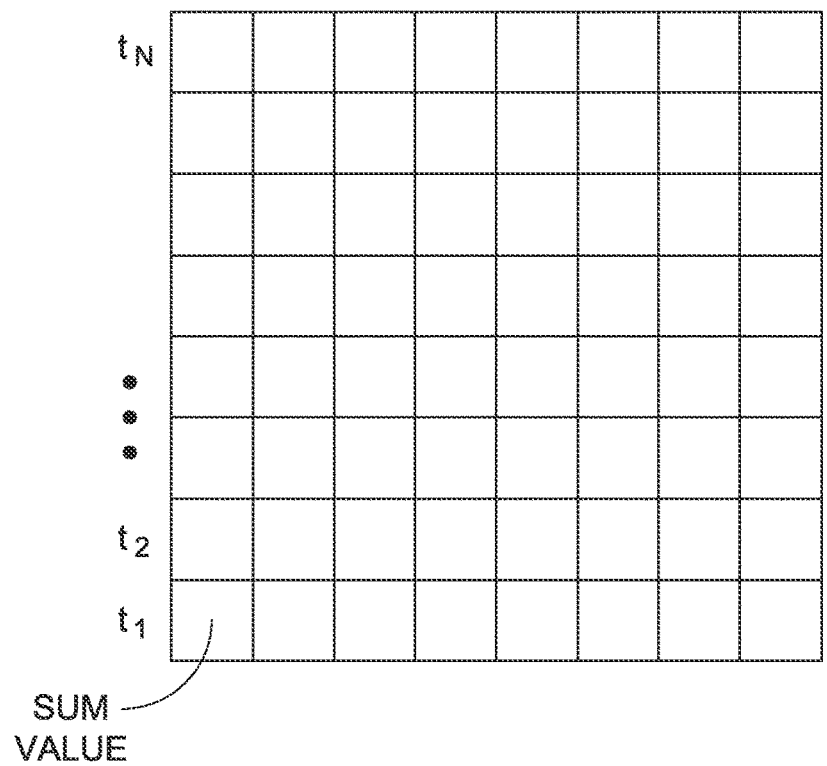
FIG. 3 a diagrammatic illustration that depicts a generated matrix of capacitances (C) based on sampling of the output voltage at time (t) in an example implementation in accordance with the present disclosure.

FIG. 2 illustrates a graph of an implementation of a drive signal bit stream at least partially based upon the values furnished by an excitation matrix E module 109 (see FIG. 1) in accordance with the present disclosure. Each drive electrode 108 has a discrete set of binary sequences with N bits ("chips") (FIG. 2 illustrates a binary sequence for two of the drive electrodes). If there are R drive electrodes 108 and C sensor electrodes 110, then N is represented by the maximum number of either R or C. The sequence of chips for the drive electrodes 108 are at least partially defined within the excitation matrix E module 109. The excitation matrix E module 109 is representative of hardware, software, combinations thereof, and the like that is configured to maintain the excitation values within a matrix format that are utilized to assist in modulating the drive signal (e.g., excitation matrix E module 109 includes a discrete value corresponding to a drive electrode 108). In an implementation, the excitation values from the module 109 are furnished to the multiplier 113, which is configured to multiply the signal furnished from the signal generator 114 to generate the chips. Thus, N chips are sent to the touch panel assembly 107 for every signaling interval from $T_f$ to $T_{f+1}$ (see FIG. 2). At $t_1$, the output signal is sampled at the receiver 106. The output signal is not represented as each individual signal from each individual drive electrode 108, but rather the sum of the signals from all of the drive electrodes 108. FIG. 3 illustrates an example matrix C accessible by the controller 102, which represents the sum values of capacitances based upon a sampling of the output signal at time t. For example, each matrix element includes the determined mutual capacitance value corresponding to each pixel (e.g., each pixel within the touch panel assembly 107 has a mutual capacitance). The matrix of the mutual capacitance values (values as determined by the change in voltage) are stored within a matrix C module 111 (see FIG. 1). The matrix C module 111 is representative of hardware, software, combinations thereof, and the like, that is configured to store the mutual capacitive values within a matrix format. The mutual capacitance value stored at coordinate (i,j), where i represents a drive electrode 108 location and j represents a sensor electrode 110 location, comprises an element of matrix C module 111, which may be represented by $C_m(i,j)\epsilon F$. Thus, utilizing suitable discrete signaling mathematical processing, the resulting value of each $C_m$ (difference in the capacitance values from the baseline measurements to the detected change in capacitances) can be obtained by utilizing the corresponding values from the matrix E module 109 times (the dot product of) the corresponding values from the matrix C module 111, which are stored in the matrix F module 115. In the event the controller 102 wants to recover the values for the C module 111, the controller 102 can perform the inverse of the matrix $E*C_m$, which is represented by:

$$F = \text{inverse}(E) * C_m. \quad \text{(Equation 4)}$$

The inverse values stored within the matrix E module 109 are stored within the inverse matrix E module 117, which is shown in FIG. 1. In an implementation, if the receiver 106 is sensing the output signal at one hundred kilohertz (100 kHz) and there are twenty (20) drive electrodes 108, twenty (20) chips are required to solve the set of linear equations to determine a capacitance $C_m$.

Figure 4:
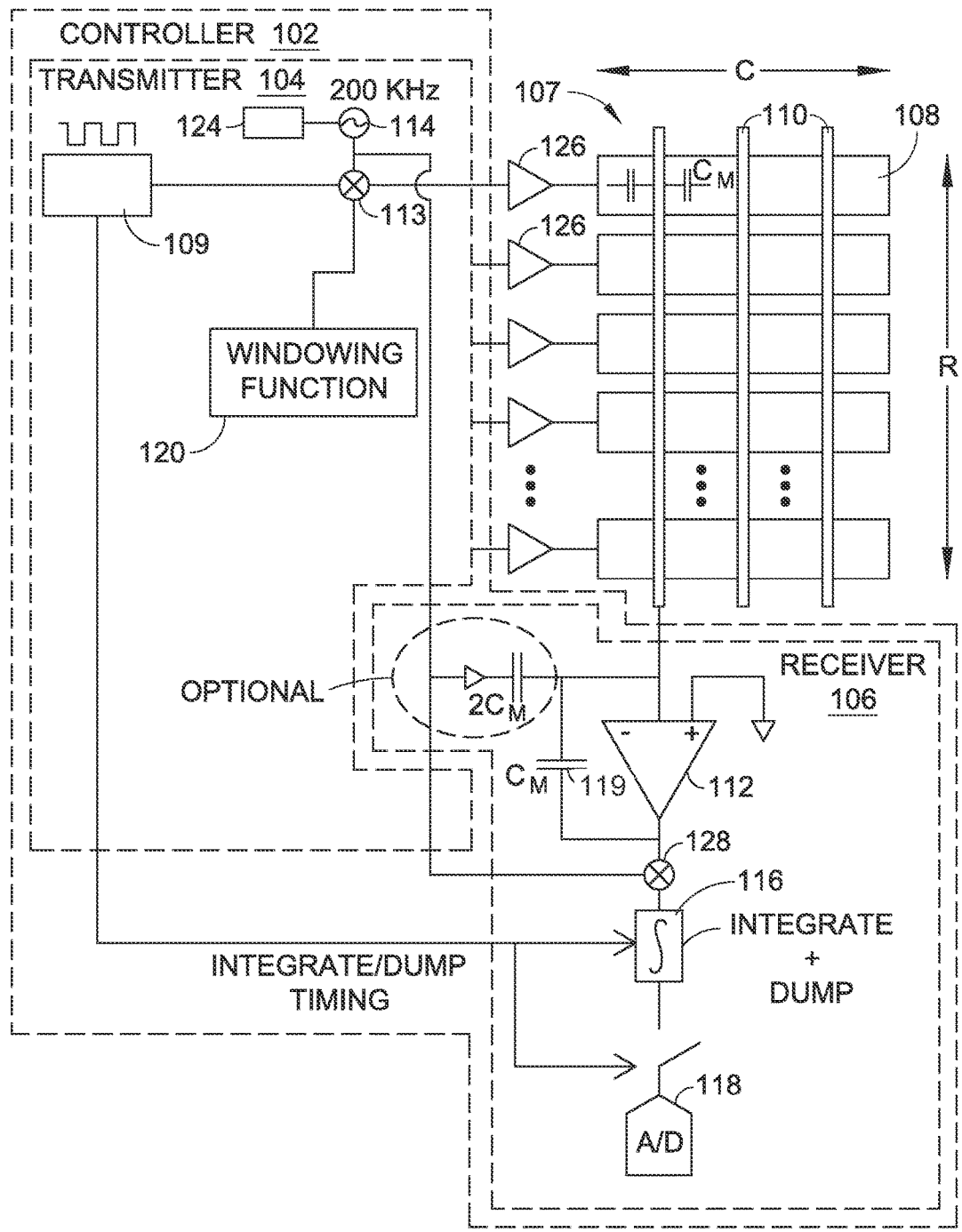
FIG. 4 is a diagrammatic illustration that depicts a touch panel system that employs an integrate-and-dump unit in an example implementation in accordance with the present disclosure.

FIG. 4 illustrates a portion of the touch panel system 100 shown in FIG. 1. An integrate-and-dump module 116 integrates over every chip interval and provides an output signal at the end of the chip interval. The integrate-and-dump module 116 is configured to generate a cumulative sum of the discrete-time input signals (e.g., output signal from the operational amplifier 112), while resetting the sum to zero according to a predefined time intervals (I). For example, the module 109 is configured to sum the output signal from the operational amplifier 112 and reset the sum to zero every I input samples, where I represents the integration period parameter. The output signal furnished from the module 109 is provided to an analog-to-digital (A/D) converter 118. The A/D converter 118 is configured to furnish the output signals to the matrix C module 111.

Figure 5:
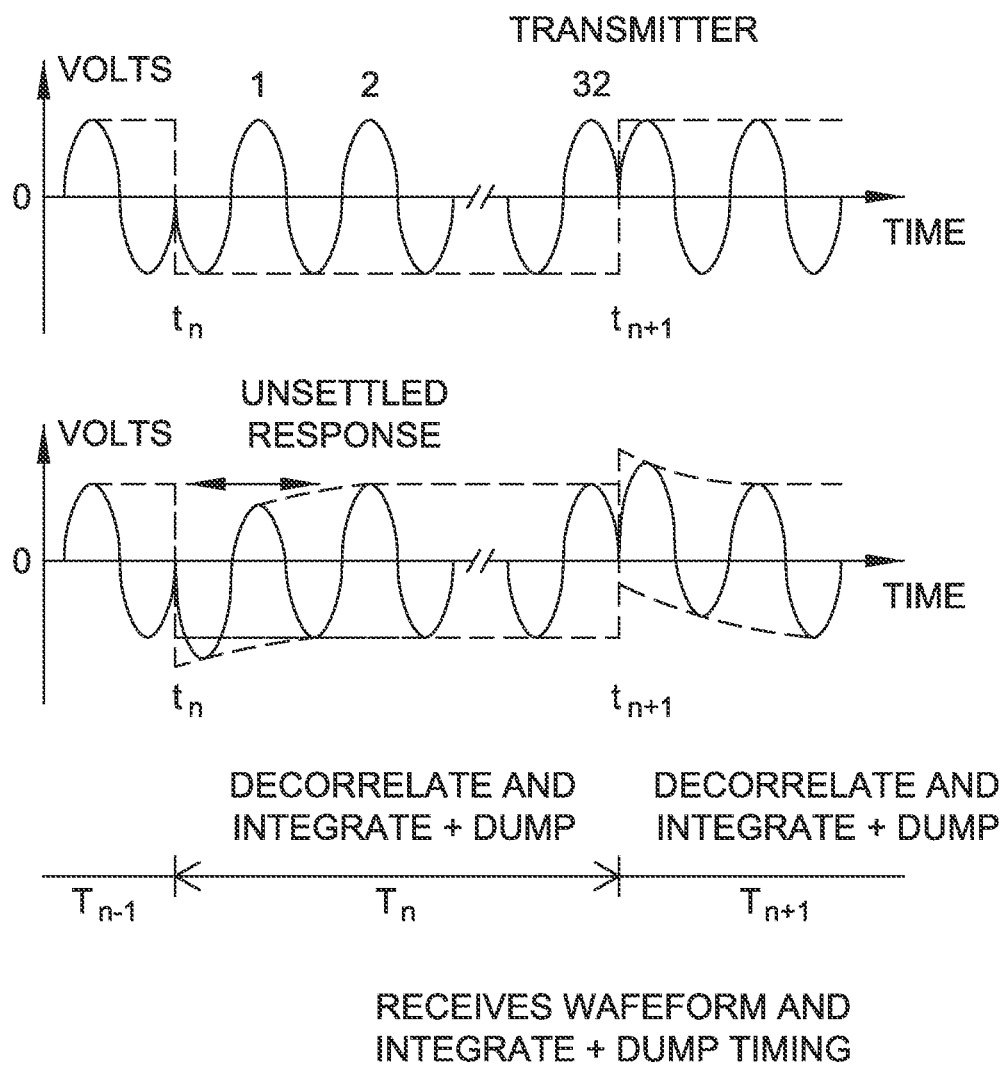
FIG. 5 is a diagrammatic graph depicting transmitting signaling of the touch panel system shown in FIG. 4, the effect of channel response at the receiver, with the corresponding time period in an example implementation in accordance with the present disclosure.

FIG. 5 illustrates graphs representing signals generated by the transmitter 104 (see top waveform) and signals received by the receiver 106 over a time period (see bottom waveform). Due to the one hundred and eighty (180) degrees phase shift of the output signal, there is unsettled time response of the channel filter over which there is an inter-carrier interference (ICI).

In an implementation, the controller 102 may not actuate the integrate- and dump operation when the output signal at the receiver 106 is unstable (e.g., the output signal at the receiver 106 is still settling, or transitioning to a steady state), but rather wait until the output signal has reached a steady-state (e.g., signal output from the sensor electrodes is in an equilibrium state). Upon the output signal reaching the steady state, the integrate-and-dump module 116 is configured to perform integrate-and-dump operations on the output signal (e.g., sum the output signal over the predefined time interval I).

Figure 6:
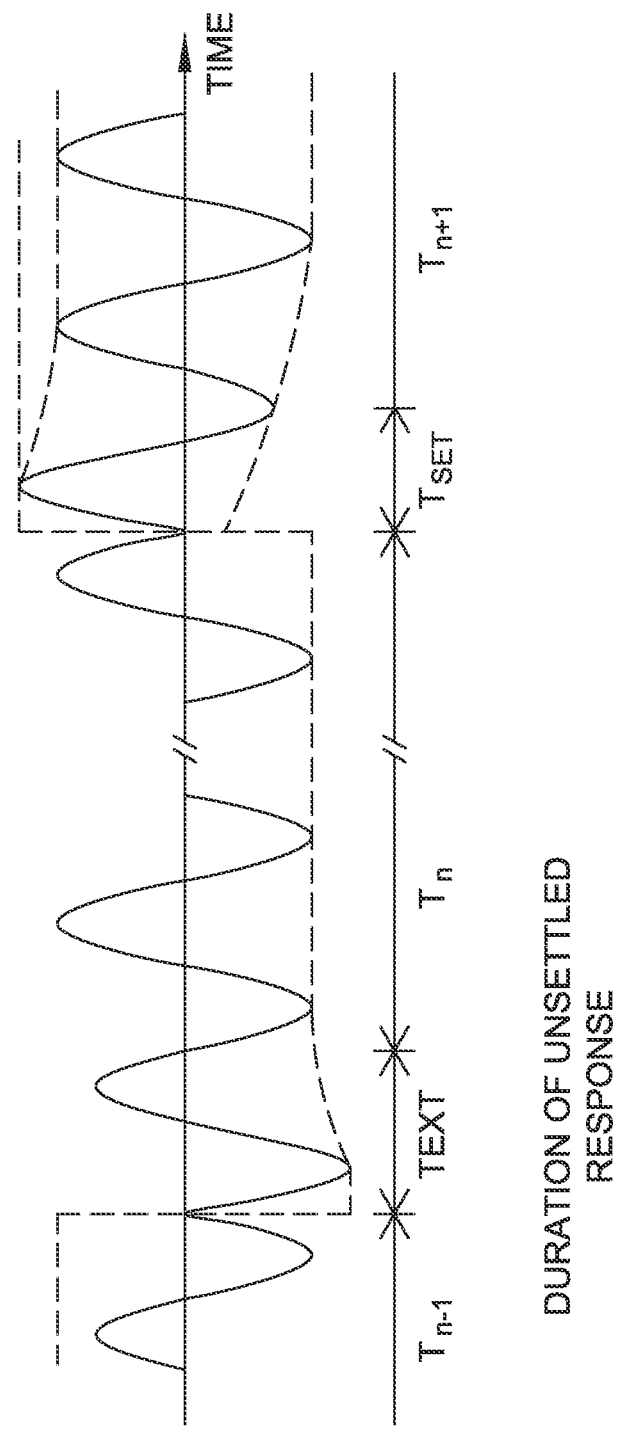
FIG. 6 illustrates the implemented delay in starting the integrate-and-dump or sampling operation.

FIG. 6 illustrates the implemented delay in starting the integrate-and-dump, or sampling operation, showing the extension of each chip in time to allow for the signal to settle (e.g., reach an equilibrium state). The corresponding window T for decorrelation and integrate-and-dump is also shown.

Figure 7:
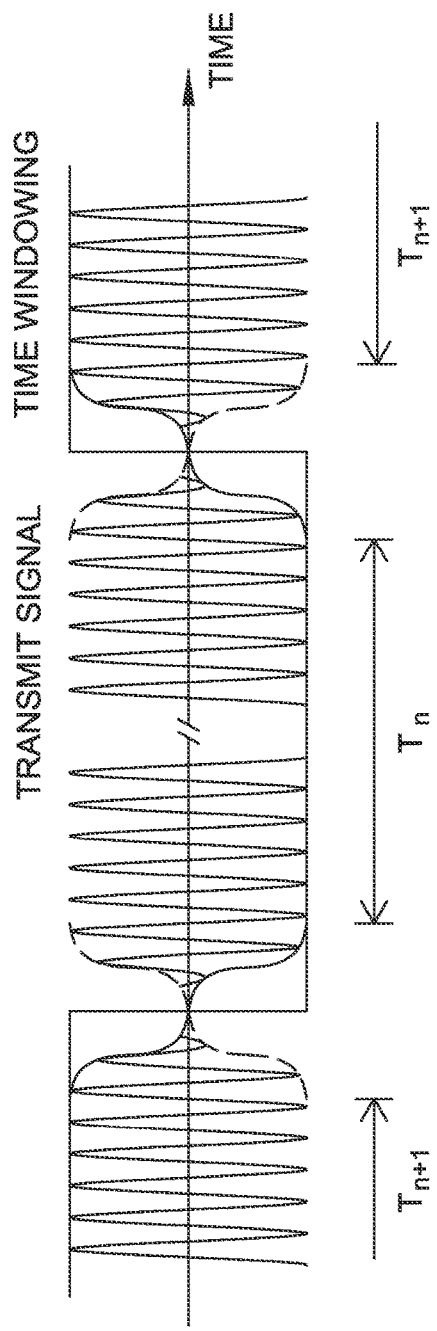
FIG. 7 illustrates an implementation of a time windowing function in accordance with the present disclosure.
Figure 8:
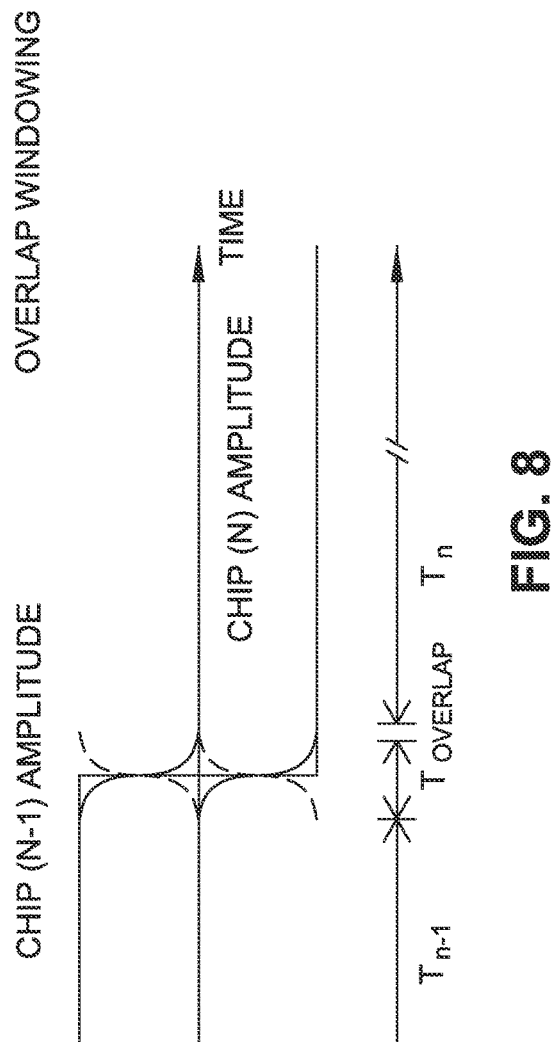
FIG. 8 illustrates an implementation of an implementation of an overlapping windowing function in accordance with an example implementation of the present disclosure.

In one or more implementations, a windowing function is applied to the input signal via a windowing module 120. The windowing module 120 represents functionality to select a subset of a series of signals to allow the controller 102 to perform calculations (e.g., perform a Fourier transform, etc.) upon the subset of signals. For example, the windowing functions may include, but are not limited to: rectangular windowing functions, Hann windowing functions, Hamming window functions, a cosine windowing function, or the like. In an implementation, the windowing function may cause the value of the signal occurring outside the defined subset of the signal to be zero (0) to reduce ringing and out-of-band spectral energy. FIGS. 7 and 8 illustrate varying windowing techniques (non-overlap and overlap), as well as corresponding windows for decorrelation and integrate-and-dump operations. The windowing module 120 may apply an overlapping window function, which may include subdividing the sampling subset into smaller sets to window the smaller sets individually. In order to mitigate any signal loss at the edges of the window, each individual set may include a portion of the next, or previous, window set (e.g., a portion of the signals may overlap in time). FIG. 7 illustrates a chip (signal) smoothly (e.g., without significant jitter) transitioning to zero (0). The next chip smoothly transitions to the chips' peak value. Thus, when a smooth signal is furnished to a filter, the output signal from the filter settles faster as compared to a signal having significant jitter, which allows initiation of the integrate-and-dump operation at the signals' peak. In implementations, a window such as a raised-cosine window, a Hann window, or a Hamming window is applied to the drive (input) signal, as well as the output signal furnished to the receiver. For example, the windowing module 120 is configured to apply a windowing function to the offset signal generator 123. The offset signal generator 123 is configured to generate an offset signal to at least substantially cancel the drive signal generated by the transmitter 104 so that the resulting signal represents the detected change in capacitance (due to the instrument coming into contact with the assembly 107). Thus, by applying the same windowing function to the offset signal generator 123, the cancelling signal corresponds to the drive signal.

FIG. 8 illustrates an overlap of the windowing function to assist in speeding up operation of the system 100. For example, all of the chips transition (change) at least approximately simultaneously, which allows the chip time interval to be fixed. Thus, the software code sequence for a first drive electrode is different from the software code sequence for a second drive electrode. For example, if there are twenty (20) drive electrodes, a twenty by twenty (20×20) matrix is required to represent the code sequence for every drive electrode. The matrix may be invertible to recover the mutual capacitance matrix (touch profile). For example, the received matrix C may be multiplied with the inverse of the excitation matrix, as represented by F=inv(E)*C. Preferably, the excitation matrix E 109 includes a plurality of 1 and −1 values, which are utilized due to the ability to modulate a signal having periodic wave characteristics (e.g., a sine wave) by 1 and −1. If the excitation matrix is comprised of a matrix of 1 and −1 values, then the excitation matrix may be invertible to recover the touch profile. The touch profile represents the total mutual capacitance. Thus, the touch profile may include the baseline values, as described above, and the touch profile for the instrument (e.g., finger). One method to decode it is to select an excitation matrix with a low condition number.

The touch controller 102 is configured to differentiate between which drive electrode 102 the instrument is positioned over by virtue of the chips. For example, each chip sequence is different for each drive electrode 102, so the controller 108 is configured to solve a set of linear equations to determine which coordinate location (e.g., drive electrode) experiences the change in capacitance. Thus, the controller 108 is configured to determine where the capacitance transition occurred based upon the particular chip, which corresponds to a particular drive electrode 102. As described above, the controller 108 is configured to perform matrix algebra to determine which drive electrode 102 experiences the change in capacitance.

Figure 9:
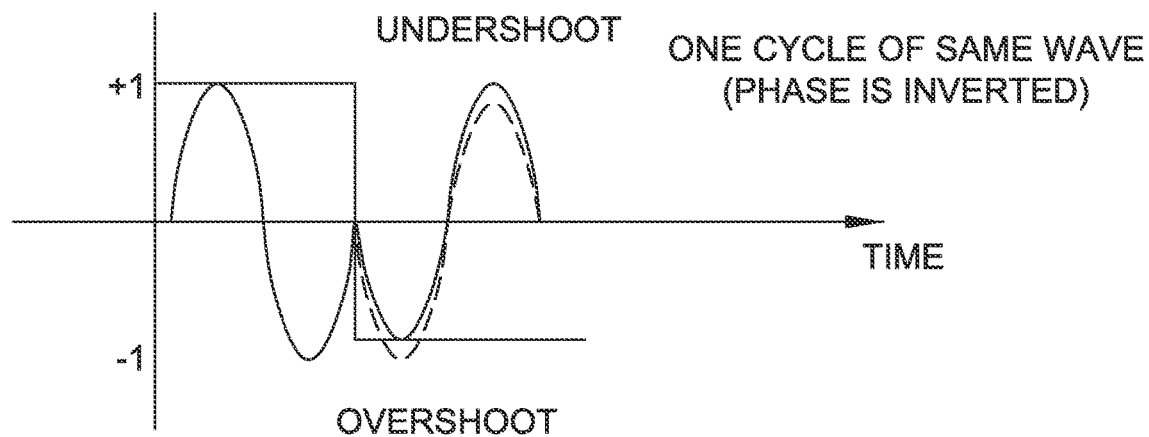
FIG. 9 illustrates an example of a signal having periodic waveform characteristics, the signal having an overshoot and undershoot.
Figure 10:
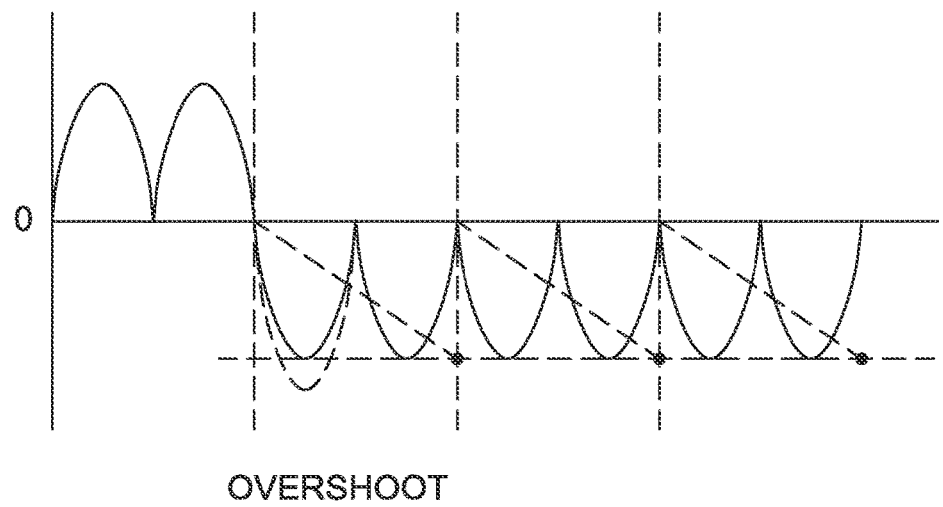
FIG. 10 illustrates an implementation of the integrator values corresponding to signals illustrated in FIG. 9.

FIG. 9 illustrates an implementation of an output signal having periodic waveform characteristics (e.g., a sine wave) having an overshoot and an undershoot from the output of a code decorrelator. FIG. 10 illustrates an implementation of the signal values furnished by the integrator-and-dump module 116 in which the signals correspond to FIG. 9.

Figure 11:
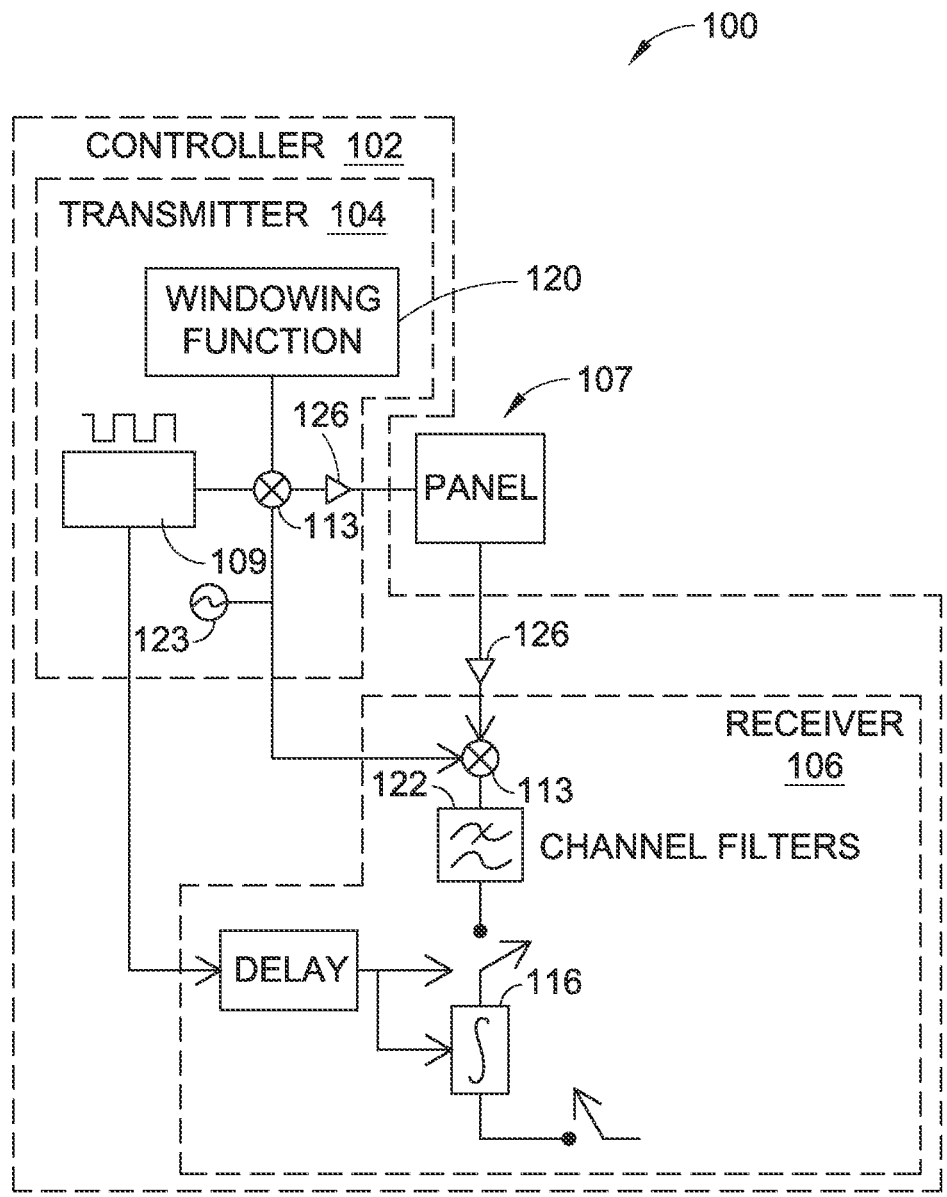
FIG. 11 illustrates yet another embodiment of a touch panel system in accordance with an example implementation of the present disclosure.
Figure 12:
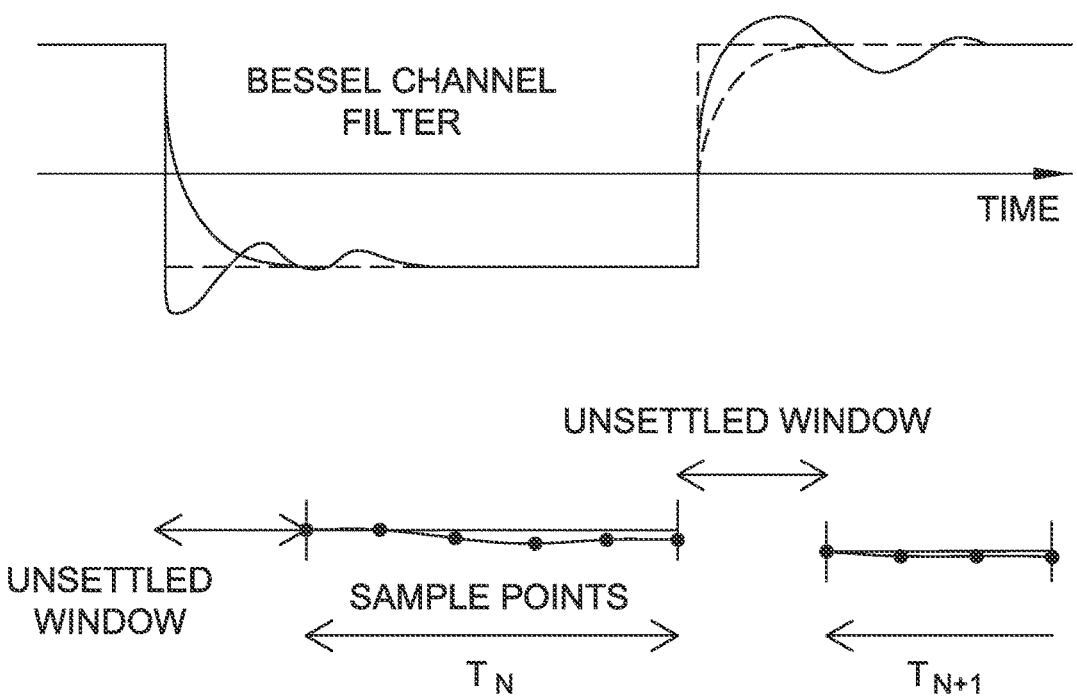
FIG. 12 illustrates the effect of utilizing a channel filter, such as a Bessel channel filter, in accordance with an example implementation of the present disclosure.

FIG. 11 illustrates yet another implementation of a touch panel system 100 utilizing a channel filter 122. For example, in one or more implementations, the integrate-and-dump module 116 may be replaced by a low-pass channel filter 122 (e.g. a 5$^{th}$ order Bessel filter) that is configured to at least substantially allow a signal at least substantially pass when the signal has a frequency between a first frequency and a second frequency (and configured to at least substantially attenuate the signal when the signal has a frequency between the second frequency and a third frequency). As shown, the system 100 may employ a delay component 125 in communication with the excitation module 109 and the integrate-and-dump module 116. FIG. 12 illustrates example sampling instances of a signal using the low-pass channel filter 122. It is contemplated that the receiver 106 samples the signals furnished by the touch panel assembly 107 when the system 100 reaches a steady state (see FIG. 12). The output samples taken by the receiver 106 are based on the channel filter bandwidth. The time separation of the signal samples is approximately one over the bandwidth (1/bandwidth) in order to have the samples sufficiently uncorrelated in time. If the bandwidth of the filter approximately equals the chip rate, then one signal sample per chip may be sufficient. If bandwidth of the filter is greater than the chip rate, then multiple signal samples separated by one over the bandwidth (1/bandwidth) may be required. These signal samples may require integrate-and-dump operations for optimum signal to noise ratio.

Figure 13:
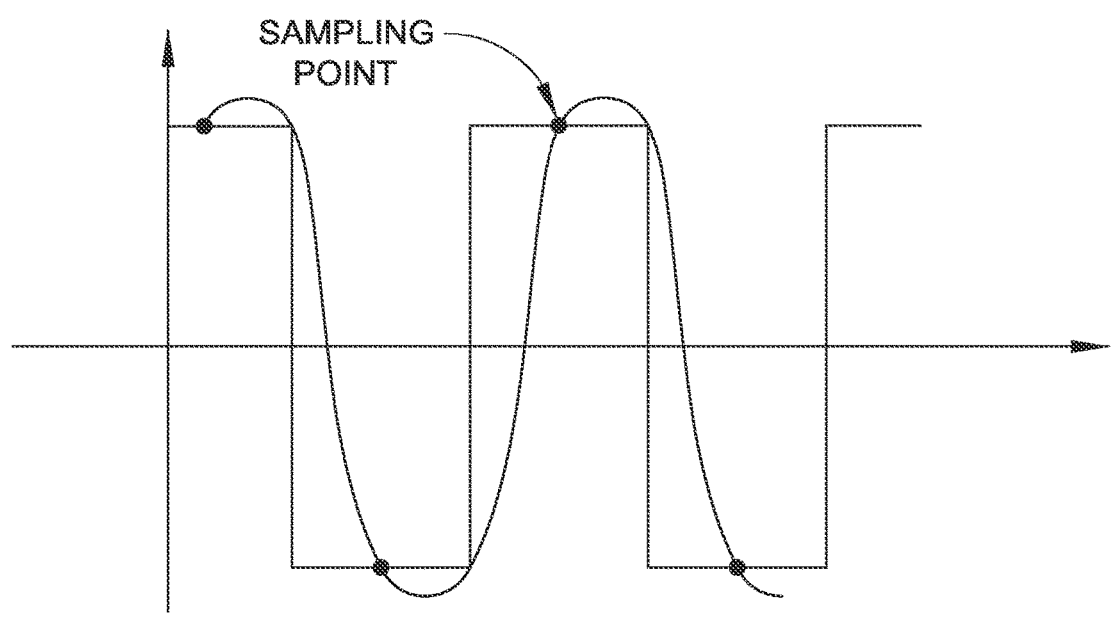
FIG. 13 illustrates the use of a Nyquist filter in accordance with an example implementation of the present disclosure.

In one or more implementations, the filter may comprise a raised cosine filter, a Nyquist filter, or the like. With a Nyquist filter, the bandwidth of the Nyquist filter is adjusted to the chip rate. FIG. 13 illustrates an implementation of the time element of Nyquist filters with the bit stream superimposed. The Nyquist filter may allow the chip (bit) stream to pass through with overshoot, which may cause the sampled signal to continuously overshoot and undershoot. However, if the receiver 106 samples near the middle of the chip (bit), the receiver 106 may at least approximately sample near the correct sample point.

The filter design may be critical to the system's 100 performance. For example, the signal to noise ratio at the output of the integrate-and-dump module 116 should be in the fifty decibel (50 dB) range for good performance. Another technique is to use an inverse channel filter, which compensates for ringing. This technique is called channel equalization. In some embodiments, this channel equalizer is used in combination with the mutual capacitance touch controller.

Additionally, the transmitter 102 may employ a pulse shaping module 124, which may be implementable in hardware, software, combinations thereof, or the like. The pulse shaping module 124 is configured to modulate the drive signal to limit the effective bandwidth of the transmission. Thus the inter-symbol interference (ISI) may be controlled by modulating the drive signal via suitable pulse shaping methods. As shown, the pulse shaping module 124 is coupled to the signal generator 114 to modulate the drive signal.

As described above, the system 100 employs various techniques and methods to reduce inter-symbol interference within the system 100. As described above, a plurality of drive signals are generated by the transmitter 104 to drive the drive sensors 108. In an implementation, the multiplier 113 generates the drive signal based upon values furnished by the excitation matrix module 109 and the signal generator 114. Additionally, the windowing module 120 may apply a windowing function to cause only a portion of the drive signal to drive the drive sensors 108. As shown in FIG. 1, the drive signals are passed through a buffer 126 before driving the drive sensors 108. As described above, baseline output voltage signal values are stored within the baseline storage module 121 (e.g., the signal values when no instrument alters the capacitive values within the assembly 107). The baseline output voltage signal values are utilized to determine the change in voltage due to a capacitive change within a pixel of the touch panel assembly due to an instrument being positioned over the assembly 107.

The receiver 106 is configured to sample the output voltages. For example, the operational amplifier 112 is configured to detect the change in voltage due to the change in capacitance. Additionally, the offset signal generator 123 is configured to offset the drive signal to allow the receiver 106 to at least substantially detect the change in voltage (and not the drive signal). The voltage signal may be furnished to the integrate-and-dump module 116, or the filter 122 in some implementations, before being furnished to the A/D converter 118. The converters 118 furnish a signal representing a voltage change (e.g., a capacitance change) to the matrix C module 111, which are stored in matrix form as described above. The values from the matrix C module 111 are provided to the multiplier 128, which is configured to multiply the values from the module 111 with the values stored within the inverse matrix E module 117. The signals from the multiplier 128 are furnished to the summation module 130, which sums the signals from the multiplier 128 and the signal values from the baseline storage module 121. The values, which represent the change in voltage due to one or more instruments being positioned over the touch panel assembly 107 are stored within the matrix F module 115. For example, the summation module 130 may subtract the baseline signal values from the signal values furnished from the summation module 130. The difference in the signal values is furnished to the matrix F module 115. The values from the matrix F module 115 may be furnished to other components associated with the touch panel assembly 107 to determine the position of the instrument over the touch panel assembly 107.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims. It is contemplated that the modules described herein may be implemented in hardware, software, firmware, combinations thereof, and so forth.

What is claimed is:

1. A controller for controlling a capacitive touch panel assembly, the capacitive touch panel assembly including a plurality of drive electrodes and a plurality of sensor electrodes, each sensor electrode crossing at least one of the drive electrodes, each crossing of a drive electrode and a sensor electrode having a mutual capacitance, the controller comprising:
   a transmitter to drive at least one drive electrode of the plurality of drive electrodes, the transmitter including:
     at least one signal generator to generate a carrier signal having a carrier waveform,
     at least one excitation module to provide a plurality of excitation values,
     at least one modulator to modulate the carrier signal based on the excitation values to provide a drive signal having a modulated waveform defining a series of symbols, and
     at least one first windowing module to apply a first window function to the symbols to provide a windowed drive signal having a windowed waveform; and
   a receiver to sense a first output signal from at least one sensor electrode of the plurality of sensor electrodes, the receiver including:
     at least one offset signal generator to generate an offset signal, the offset signal resulting from application of the first window function to the offset signal generator and having an offset waveform configured to cancel a portion of the first output signal corresponding to the modulated waveform of the drive signal, and
     at least one amplifier having an input coupled with the at least one sensor electrode so as to receive the first output signal, the input also coupled with the offset signal generator so as to receive the offset signal, the amplifier configured to provide a sensed signal based on the first output signal and the offset signal.

2. The controller of claim 1, wherein the sensed signal is an output voltage representing an amplified signal furnished from the sensor electrodes.

3. The controller of claim 1, wherein the first window function is configured to overlap adjacent symbols in the drive signal.

4. The controller of claim 1, wherein the first window function includes a raised-cosine window, a Hann window or a Hamming window.

5. The controller of claim 1, wherein the receiver further includes a filter to filter the sensed signal to decrease a settling time of the sensed signal.

6. The controller of claim 5, wherein the filter includes a Bessel filter or a Nyquist filter.

7. The controller of claim 5, wherein the filter has a bandwidth approximately equal to a modulation rate of the drive signal.

8. The controller of claim 7, wherein the receiver further includes an analog-to-digital converter (ADC) to sample the filtered signal.

9. The controller of claim 8, wherein the ADC is configured to sample the filtered signal at a sampling rate approximately equal to a modulation rate of the drive signal.

10. The controller of claim 1, further including an integrate-and-dump module to provide a cumulative sum of the sensed signal over a time duration.

11. The controller of claim 10, wherein the receiver further includes an analog-to-digital converter (ADC) to sample an output of the integrate-and-dump module.

12. The controller of claim 1, wherein the excitation module including an orthogonal excitation matrix including the excitation values, the transmitter being configured to drive the plurality of drive electrodes with respective drive signals substantially simultaneously, each of the drive signals being orthogonal to one another.

13. A device comprising:
   a capacitive touch panel assembly including a plurality of drive electrodes and a plurality of sensor electrodes, each sensor electrode crossing at least one of the drive electrodes, each crossing of a drive electrode and a sensor electrode having a mutual capacitance; and
   a controller including:
     a transmitter to drive at least one drive electrode of the plurality of drive electrodes, the transmitter including:
       at least one signal generator to generate a carrier signal having a carrier waveform,
       at least one excitation module to provide a plurality of excitation values,
       at least one modulator to modulate the carrier signal based on the excitation values to provide a drive signal having a modulated waveform defining a series of symbols, and
       at least one first windowing module to apply a first window function to the symbols to provide a windowed drive signal having a windowed waveform; and
     a receiver to sense a first output signal from at least one sensor electrode of the plurality of sensor electrodes, the receiver including:

at least one offset signal generator to generate an offset signal, the offset signal resulting from application of the first window function to the offset signal generator and having an offset waveform configured to cancel a portion of the first output signal corresponding to the modulated waveform of the drive signal, and at least one amplifier having an input coupled with the at least one sensor electrode so as to receive the first output signal, the input also coupled with the offset signal generator so as to receive the offset signal, the amplifier configured to provide a sensed signal based on the first output signal and the offset signal.

14. The device of claim 13, wherein the sensed signal is an output voltage representing an amplified signal furnished from the sensor electrodes.

15. The device of claim 13, wherein the first window function is configured to overlap adjacent symbols in the drive signal.

16. The device of claim 13, wherein the receiver further includes a filter to filter the sensed signal to decrease a settling time of the sensed signal.

17. The device of claim 16, wherein the filter includes a Bessel filter or a Nyquist filter.

18. The device of claim 16, wherein the filter has a bandwidth approximately equal to a modulation rate of the drive signal.

19. The device of claim 18, wherein the receiver further includes an analog-to-digital converter (ADC) to sample the filtered signal.

20. The device of claim 19, wherein the ADC is configured to sample the filtered signal at a sampling rate approximately equal to a modulation rate of the drive signal.

* * * * *